United States Patent
Townsend

[15] 3,703,199
[45] Nov. 21, 1972

[54] AUTOMATIC BLADE CONTROL MECHANISM FOR MEAT SKINNING MACHINES

[72] Inventor: Ray T. Townsend, Des Moines, Iowa
[73] Assignee: Townsend Engineering Company, Des Moines, Iowa
[22] Filed: April 9, 1970
[21] Appl. No.: 26,987

Related U.S. Application Data

[63] Continuation-in-part of Ser. No. 706,941, Feb. 20, 1968, Pat. No. 3,559,707, which is a continuation-in-part of Ser. No. 616,692, Feb. 16, 1967, abandoned.

[52] U.S. Cl..................................99/589, 69/13
[51] Int. Cl..............................................A22c 17/12
[58] Field of Search .................146/130, 131; 69/13

[56] References Cited

UNITED STATES PATENTS

| | | | |
|---|---|---|---|
| 2,455,831 | 12/1948 | Townsend | 146/130 |
| 3,360,026 | 12/1967 | Schill | 146/130 |

*Primary Examiner*—Willie G. Abercrombie
*Attorney*—Zarley, McKee & Thomte

[57] ABSTRACT

An automatic blade control mechanism for meat skinning machines comprising a laterally extending skin gripping roll having a cutting blade movably positioned adjacent thereto. A power means is connected to the gripping roll to cause the rotation thereof so that a layer of meat can be moved rearwardly towards the cutting blade to separate a layer of skin from the meat. A blade control means is connected to the opposite ends of the cutting blade to cause the cutting blade to automatically move into a cutting position upon engagement with the meat. Each of the blade control means comprises an end plate secured to the end of the cutting blade and having a biased support means connected thereto which yieldably resists the upward movement of the cutting blade away from the gripping roll. A support arm is secured to the support means and is operatively connected to a crank arm having its axis of rotation below and forwardly of the rotational axis of the gripping roll. The rearward end of the crank arm is pivotally connected to the upper end of a spring loaded rod which is pivotally and slidably connected adjacent its lower end to a control lever. The control lever may be selectively pivotally moved to a first position whereby the cutting blade is moved outwardly and rearwardly from the gripping roll for cleaning purposes. The control lever is yieldably normally positioned in a second position wherein the cutting blade is in a position to move into its cutting position. The engagement of the cutting blade by the meat causes the support arm and the crank arm to be pivotally moved thereby causing the spring loaded rod to yieldably and slidably move downwardly, against the spring resistance imposed thereon, with respect to the control lever to permit the cutting blade to move into its cutting position to separate the layer of skin from the meat. The instantaneous initial bite of the cutting blade into the meat is enhanced and accelerated by pivoting the cutting blade from its position adjacent the gripping roll rearwardly and downwardly into its cutting position.

16 Claims, 8 Drawing Figures

PATENTED NOV 21 1972
3,703,199
SHEET 1 OF 3
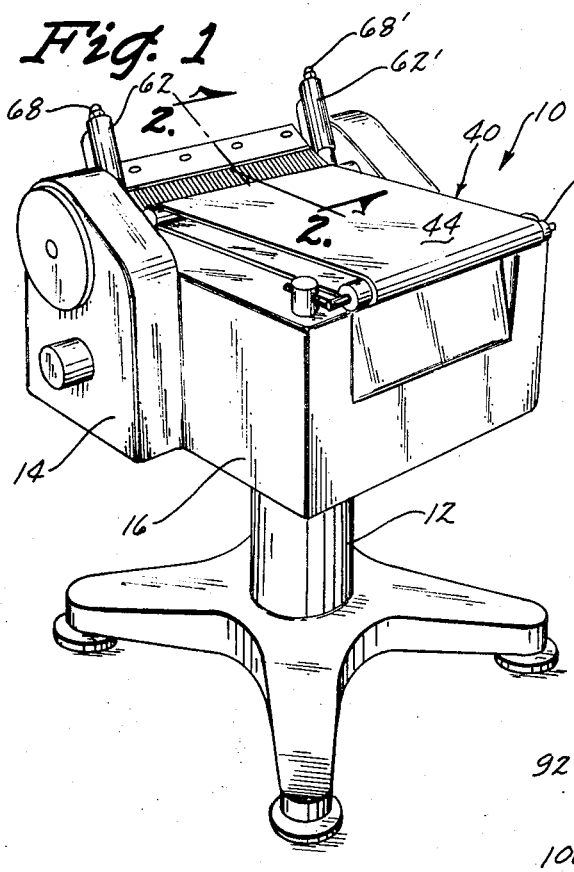
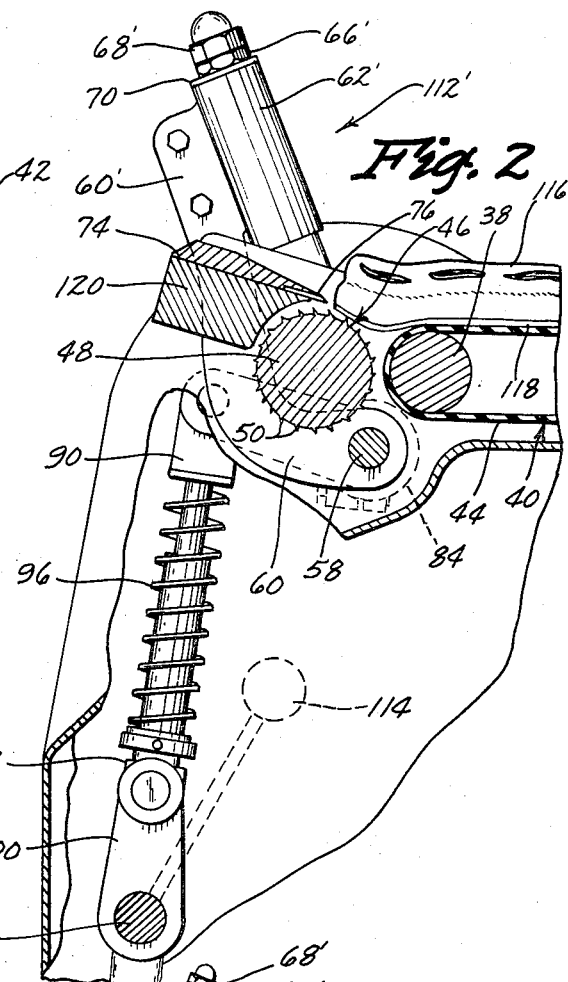
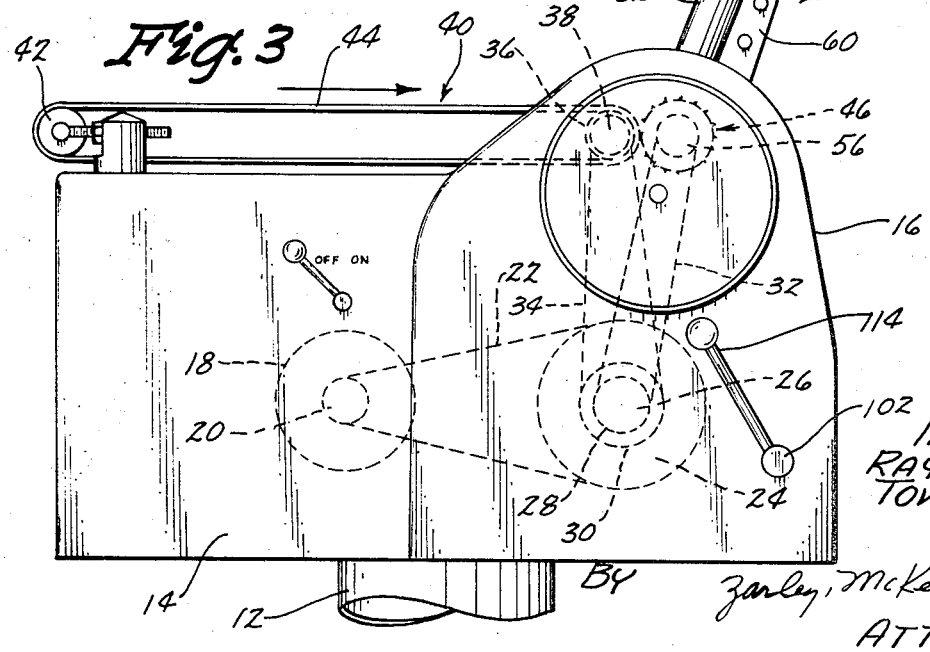
INVENTOR
RAY T. TOWNSEND
BY Zarley, McKee & Thomte
ATTORNEYS

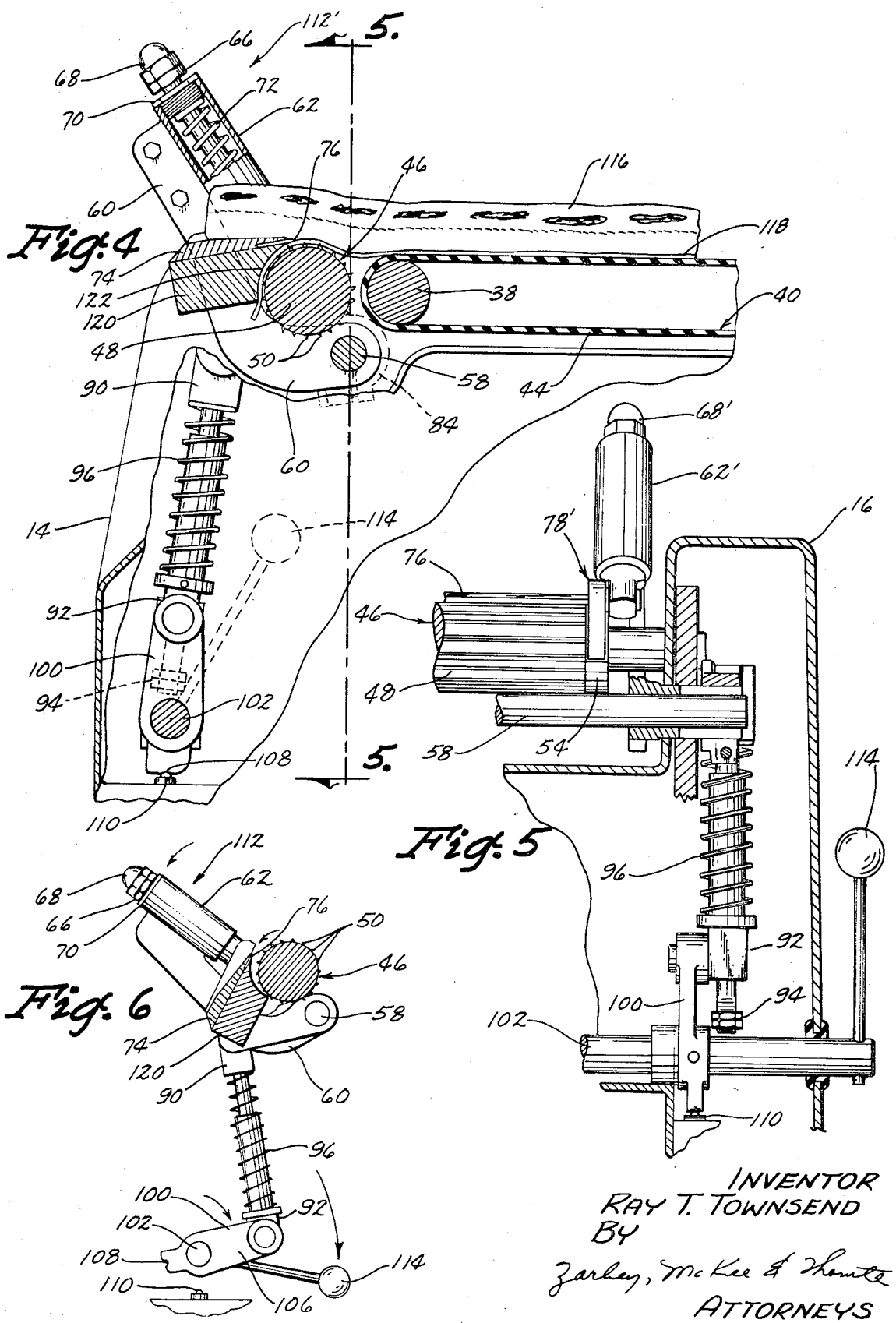

INVENTOR
RAY T. TOWNSEND
BY
Zarley, McKee & Thomte
ATTORNEYS

AUTOMATIC BLADE CONTROL MECHANISM FOR MEAT SKINNING MACHINES

An Automatic Blade Control Mechanism For Meat Skinning Machines of which the following is a specification. This application is a continuation-in-part application of the application Ser. No. 706,941 filed Feb. 20, 1968, now U.S. Pat. No. 3,559,707 which was a continuation-in-part application of the application Ser. No. 616,692 filed Feb. 16, 1967, now abandoned.

A problem of prior art skinning devices is the limited number of pieces of meat that can be skinned in a given period of time. In some machines, the skinning cycle is manually controlled, and in others the skinning machine is set to cycle only a given number of times during a fixed period of time. It is therefore an object of this invention to provide a means for skinning meat that can greatly increase the number of pieces of meat that can be skinned in a given period. In this same connection, it is a still further object of this invention to provide a means for skinning meat that will permit the skinning blade to quickly be automatically moved to a cutting position so that an excess of fat will not be left on the edge of the skin initially cut from the meat.

A still further object of this invention is to provide an automatic blade control mechanism which automatically moved into a cutting position upon engagement with the meat thereby enhancing and accelerating the instantaneous initial bite of the blade into the meat.

A further object of this invention is to provide an automatic blade control mechanism for meat skinning machines having means thereon to permit the cutting blade to compensate for various skin thicknesses.

A further object of this invention is to provide an automatic blade control mechanism for meat skinning machines which permits the cutting blade to be pivotally moved outwardly from the gripping roll for cleaning purposes.

A further object of this invention is to provide an automatic blade control mechanism for meat skinning machines which automatically positions the cutting blade in its cutting position so that the layer of skin will be efficiently removed from the meat.

A further object of this invention is to provide an automatic blade control mechanism for meat skinning machines which automatically moves the cutting blade from its cutting position to a position adjacent the gripping roll after the layer of skin has been removed from the meat so that the cutting blade will be in a position to move into engagement with the next piece of meat.

A further object of this invention is to provide an automatic blade control mechanism for meat skinning machines which automatically positions the cutting blade in a proper attitude with respect to the gripping roll and meat.

A still further object of this invention is to provide an automatic blade control mechanism for meat skinning machines which is economical to manufacture, durable in use, and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a front perspective view of a meat skinning machine having the automatic blade control mechanism of this invention provided thereon.

FIG. 2 is an enlarged fragmentary sectional view as seen along line 2 — 2 of FIG. 1 illustrating the position of the cutting blade before the meat engages the same.

FIG. 3 is a fragmentary side elevational view of the machine of FIG. 1.

FIG. 4 is a view similar to FIG. 2 but which illustrates the cutting blade in its cutting position.

FIG. 5 is a fragmentary sectional view as seen along line 5 — 5 of FIG. 4.

FIG. 6 is a view similar to FIGS. 2 and 4 except that the cutting blade is illustrated in its open or cleaning position.

Figure 7:
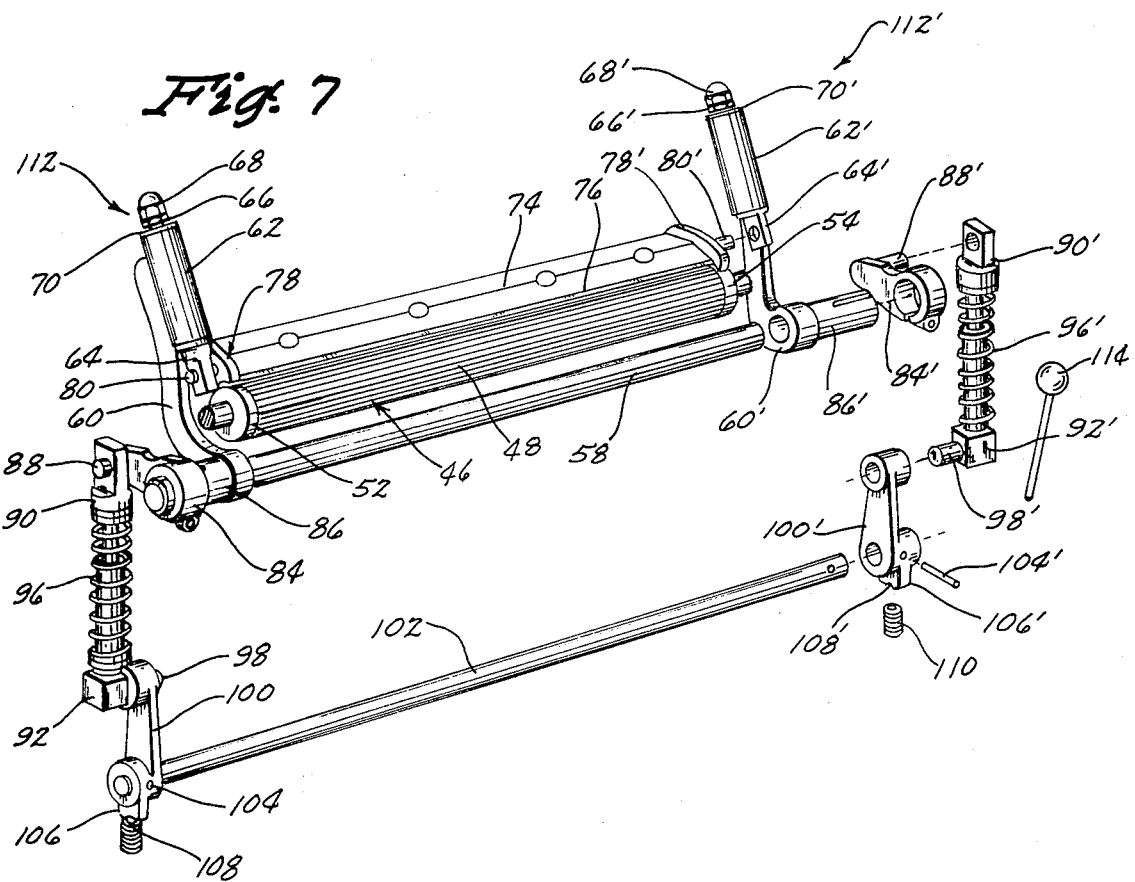
FIG. 7 is a front perspective view of the blade control mechanism of this invention.
Figure 8:
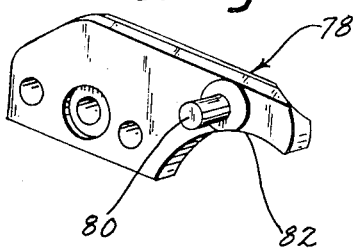
FIG. 8 is a perspective view of the end plate which is secured to one end of the cutting blade.

The numeral 10 generally refers to the skinning machine including a pedestal 12 and a frame 14. Housing 16 of fiberglass or the like is secured to frame 14 in any convenient manner. Electric motor 18 is secured to frame 14 and has a power output pulley 20 provided thereon. Belt 22 connects pulley 20 to drive pulley 24 which is mounted on shaft 26. Pulleys 28 and 30 are mounted on shaft 26 for rotation therewith and receive belts 32 and 34 thereon respectively. Conventional chains may be substituted for the belts 22, 32 and 34 if desired.

The numeral 36 designates a conveyor drive roll which is rotatably journaled in suitable bearings provided on the machine. Drive roll 36 has a pulley 38 at one end thereof which receives the belt 34 thereon. Drive roll 36 is a part of conveyor 40 which includes idler roll 42 and belt 44. A skin gripping roll 46 is rotatably mounted on the machine and has its opposite ends rotatably journaled in suitable bearings within the housing 16. Roll 46 includes a gripping surface 48 which is comprised of a plurality of continuous longitudinal teeth or serrations 50. Shield rings 52 and 54 are provided at opposite ends of the gripping surface 48, the function of which will be described hereinafter. Roll 46 has a pulley 56 mounted at one end thereof which receives the belt 32 thereon to effect the rotation thereof.

Shaft 58 is rotatably mounted on the frame means 14 at a position forwardly of and below the gripping roll 46. Support arm 60 is mounted on one end of shaft 58 for rotation therewith and extends upwardly and rearwardly therefrom. Support 62 is secured to support arm 60 by welding or the like. Support 62 includes a spring loaded arm member 64 slidably mounted therein and extending from both ends thereof. A jam nut 66 and cap nut 68 are threadably mounted on the upper end of the arm member 64 above washer 70 to limit the downward movement of the arm member 64 with respect to the support 62. Support 62 has a spring means 72 therein which resists the upward movement of arm member 64 therein.

The numeral 74 designates a cutting blade having a knife edge 76. End plates 78 and 78' are secured to opposite ends of the cutting blade 74 and include outwardly extending pins 80 and 80' respectively. Pin 80 is pivotally received by the lower end of arm member 64 and is maintained therein by a snap ring or other suitable means. End plate 78 includes an arcuate surface 82 at its lower forward end which is adapted to engage the shield ring 52 to prevent the knife edge 76 from engaging the serrations on the gripping roll 46.

The forward end of crank arm 84 embraces and is rigidly secured to the laterally extending portion 86 of support 60 as illustrated in FIG. 7. Crank arm 84 extends rearwardly as illustrated in FIG. 7 and has a pin 88 extending horizontally therefrom. Pin 88 pivotally receives the upper end of a spring loaded rod 90 which extends downwardly therefrom. Rod 90 slidably extends through a guide link 92 with jam nuts 94 being threadably mounted on the lower end thereof to limit the upward movement of the rod with respect to the guide link 92. Spring 96 yieldably resists the downward movement of rod 90 with respect to the guide link 92. Guide link 92 includes a pin 98 which extends laterally therefrom parallel to the rotational axis of shaft 58. The upper end of lever 100 is pivotally mounted on pin 98 and is maintained thereon by any suitable means such as a snap ring or the like engaging the end of pin 98. Lever 100 is mounted on shaft 102 for rotation therewith by means of a key or pin 104 extending therethrough. The lower end portion 106 of lever 100 is provided with an indentation 108 formed therein adapted to receive a spring loaded detent ball 110 when lever 100 is in the position illustrated in FIG. 4. Inasmuch as the control mechanism provided at the other end of the blade 74 is substantially identical to that just described, the identical structure will be merely identified with "'". It can be appreciated that the portion 86' and pin 88' are "left-hand" rather than the "right-hand" configuration of portion 86 and pin 88. For purposes of description, the control mechanism at one end of the blade will be described as comprising control mechanism 112 with the control mechanism at the other end of the blade being described as control mechanism 112'. Control handle 114 is secured to one end of shaft 102 outwardly of the housing 16 to permit the selective rotation of the shaft 102.

FIG. 2 illustrates the relative position of the control mechanism prior to the cutting blade 74 engaging the meat which is generally designated by the reference numeral 116 and including a layer of skin 118 thereon. In the position of FIG. 2, indentation 108 is in engagement with the detent ball 110 which yieldably maintains the components of the control mechanism in the relative position illustrated in FIG. 2. In the position of FIG. 2, the rotational axis of gripping roll 46 is disposed rearwardly of a plane extending from the rotational or pivotal axis of pin 80 and the rotational or pivotal axis of shaft 58. Likewise, in FIG. 2, the longitudinal axis of rod 90, if extended, would pass rearwardly of the rotational axis of shaft 102. In other words, the longitudinal axis of lever 100 is eccentrically offset or disposed with respect to the longitudinal axis of rod 90.

The conveyor 40 conveys the meat 116 rearwardly along the belt 44 until the end thereof comes into engagement with the rotating gripping roll 46 which causes the meat to be moved upwardly and rearwardly in the manner illustrated in FIG. 2. In the position of FIG. 2, the plane of the knife edge 76 is disposed at such an angle so that the blade will quickly and effectively make its initial bite into the meat. The engagement of the meat with the blade 74 causes the cutting blade 74 to be moved rearwardly and downwardly with respect to the cutting roll 46 with the various components of the control mechanism being moved to the position illustrated in FIG. 4. The engagement of the meat 116 with the cutting blade 74 automatically moves the cutting blade into the position illustrated in FIG. 4 which disposes the cutting blade in such a position so that an excess of fat will not be left on the edge of the skin being cut from the meat. The movement of the cutting blade 74 and its supporting shoe structure 120 causes support 62 and support member 60 to be pivoted rearwardly and downwardly with respect to the gripping roll 46. The pivotal movement of support arm 60 causes crank arm 84 to be pivotally moved in a counterclockwise manner so that the rearward end thereof pivots downwardly. The downward pivotal movement of the rearward end of crank arm 84 causes rod 90 to slidably move downwardly in guide link 92 against the resistance of the spring means 96. The eccentric relationship between the longitudinal axis of rod 90 and lever 100 permits rod 90 to slidably move downwardly in guide link 92 without causing the disengagement of indentation 108 with the detent ball 110. In the position of FIG. 4, the rotational axis of gripping roll 46 is disposed in the same plane as the plane extending between the rotational or pivotal axis of shaft 58 and the longitudinal axis of member 64 which is aligned with the rotational axis of pin 80.

The spring loaded members 64 and 64' permit the movement thereof with respect to the support 62 and 62' respectively so that the cutting blade can compensate for various skin thicknesses.

The rotating gripping roll 46 causes the skin to pass between the gripping roll and the concave surface 122 of the support shoe 120 with the skin being discharged at the rearward end of the machine. As the meat 116 passes from the machine, the springs 96 and 96' cause the end plates 78 and 78' and hence the cutting blade to be returned to the position of FIG. 2 so that the cutting blade is in position to receive the next piece of meat.

FIG. 6 illustrates the relative parts of the control mechanism in their open or cleaning position. The cleaning position is easily achieved by simply moving the handle 114 in a clockwise direction as illustrated by the arrows in FIG. 6 which causes shaft 102 to pivotally move the levers 100 and 100' thereby causing rods 90 and 90' to pivotally move the rearward ends of crank arms 84 and 84' in a downwardly direction. The pivotal movement of crank arms 84 and 84' causes the support arms 60 and 60' to move the end plates and hence the cutting blade to the cutting position illustrated in FIG. 6 to provide adequate clearance between the cutting blade and the gripping roll 40.

Thus it can be seen that a control mechanism has been provided for the cutting blade of a meat skinning machine which automatically positions the cutting blade with respect to the meat. The cutting blade is initially positioned so that the knife edge of the blade quickly and efficiently makes its initial bite into the meat. The cutting blade automatically compensates for variances in the thickness of the skin and automatically returns to its initial position after the skin has been removed from the meat. The automatic positioning of the cutting blade greatly increases the number of pieces of meat that can be skinned in a given period. Further, the substantially instantaneous positioning of the cutting blade in its cutting position insures that an excess of fat will not be left on the edge of the skin initially cut from the meat.

It can therefore be seen that the control mechanism accomplishes at least all of its stated objectives.

I claim:

1. A blade control mechanism for a skinning machine having rearward and forward ends, comprising, a laterally extending gripping roll, a blade means positioned adjacent said gripping roll, means for rotating said gripping roll whereby a layer of meat can be moved rearwardly towards said blade means to separate a layer of skin from said meat, first and second blade control means at the opposite ends of said blade means respectively, each of said blade control means comprising, an end plate secured to the end of said blade means, said end plate having rearward and forward ends, a support means pivotally secured at its lower end about a horizontal axis to said end plate adjacent the forward end thereof and extending upwardly and rearwardly therefrom, a support arm secured to said support means and extending downwardly and forwardly therefrom beneath said blade and said gripping roll, said support arm being rigidly secured at its lower forward end to a horizontally rotatably shaft means, a crank arm rigidly secured to said shaft means and extending rearwardly therefrom, a second shaft means horizontally rotatably mounted below and rearwardly of said first shaft means, a lever rigidly secured to said second shaft means extending upwardly therefrom, a guide link means pivotally secured about a horizontal axis to the upper end of said lever, a rod pivotally secured at its upper end about a horizontal axis to the rearward end of said crank arm and extending downwardly therefrom, said rod slidably extending through said guide link means on the lower end of said rod to limit the upward movement of said rod with respect to said guide link, spring means on said rod operatively engaging said guide link to yieldably resist the downward movement of said rod with respect to said guide link, means connected to said second shaft means for selectively rotating said second shaft means between at least first and second positions, yieldable means yieldably maintaining said second shaft means in its first position, the rotational axis of said gripping roll being positioned rearwardly of the plane extending between the rotational axis of first shaft means and the pivoted axis of connection of said end plate and said support means when said second shaft means is in its first position, said blade means being moved rearwardly and towards said gripping roll into a cutting position upon engaging said meat, said movement of said blade means causing the upper end of said support arm to pivotally move rearwardly thereby causing said first shaft means to pivotally move the rearward end of said crank arm downwardly thereby slidably moving said rod downwardly with respect to said guide link against the resistance of said spring means, the rotational axis of said gripping rod being in the plane extending between the rotational axis of said first shaft and the pivotal axis of connection of said end plate and said support means when said cutting blade is in its said cutting position.

2. The mechanism of claim 1 wherein said support means comprises a spring loaded support member slidably mounted therein, the lower end of said support member being pivotally connected to said end plate, a spring means engaging said support member to yieldably resist the upward movement of said support member with respect to said support means, said spring means normally urging said end plate and said blade means towards said gripping roll while yieldably permitting said blade means to move away from said gripping roll to compensate for various skin thicknesses.

3. The mechanism of claim 1 wherein said lever includes a lower end portion extending below said second shaft means, said yieldable means comprising a detent means at the lower end of said lever adapted to yieldably maintain said lever and said second shaft means in said first position, the horizontal pivotal axis of connection between said lever and said guide link being offset forwardly with respect to a plane extending between said detent means and the rotational axis of said second shaft means when said second shaft means is in its said first position.

4. The mechanism of claim 3 wherein an extension of the longitudinal axis of said rod extends rearwardly of said detent means when said second shaft means is in its first position.

5. The mechanism of claim 1 wherein said gripping roll has a shield ring provided on at least one of its ends in the forward pivotal path of the end plate rearwardly thereof, said end plate having an arcuate surface formed in its forward end adapted to engage the said shield ring to limit the pivotal movement of said blade means with respect to said gripping roll so that said cutting blade is maintained out of engagement with said gripping roll.

6. The mechanism of claim 1 wherein said blade means is pivotally moved rearwardly and away from said gripping roll upon said second shaft means being moved to its said second position, the pivotal axis of connection between said support means and said end plate being disposed rearwardly of a plane extending between the rotational axis of said gripping roll and the rotational axis of said first shaft means when said second shaft means is in its second position.

7. A blade control mechanism for a skinning machine having rearward and forward ends, comprising, a laterally extending gripping roll, a blade means positioned adjacent said gripping roll, means for rotating said gripping roll whereby a layer of meat can be moved rearwardly towards said blade means to a separate layer of skin from said meat, first and second blade control means at the opposite ends of said blade means respectively, said first and second blade control means including means to normally position said blade means in a first position with respect to said gripping roll, said first and second blade control means including means to move said blade means from its first position towards said gripping roll to a cutting position upon the meat engaging said blade means, said first and second blade control means including means to move said blade means back to its said first position upon the layer of skin being removed from said meat, said means for moving said blade means back to its first position comprising a first horizontally rotatable shaft means positioned forwardly and below said gripping roll, first and second crank arms mounted on the opposite ends of said first shaft means for rotation therewith extending rearwardly therefrom, first and second rods pivotally secured at their upper ends about a horizontal axis to the rearward ends of said first and second crank arms respectively, first support means normally yieldably urging said first and second rods upwardly, second support means operatively connecting said crank arms to said blade means whereby said first support means and said rods cause the rearward ends of said crank arms to pivot upwardly thereby causing said blade means to move back to its position upon the layer of skin being removed from said meat.

8. The mechanism of claim 7 wherein the movement of said blade means to its cutting position causes said second support means and said rods to pivot the rearward ends of said crank arms downwardly against the yieldable force of said first support means.

9. The mechanism of claim 8 wherein a first support means is operative connected to each of said rods, opposite each of said first support means comprising a guide link normally positioned rearwardly and below said gripping roll, said guide link slidably receiving the rod associated therewith, a spring means mounted on said guide link yieldably urging said rod upwardly with respect thereto.

10. The mechanism of claim 9 wherein a second horizontally rotatable shaft means is positioned below and rearwardly of said first shaft means, first and second levers rigidly secured to the opposite ends of said second shaft means and extending upwardly therefrom, the upper ends of said levers being pivotally connected about a horizontal axis to said guide links, said second shaft means being rotatable between first and second positions whereby said first and second blade control means are positioned in their operative positions when said second shaft means is in its first position and whereby said first and second blade control means are moved to an inoperative position to facilitate the maintenance of said blade means when said second shaft means is moved to its second position.

11. The mechanism of claim 9 wherein an end plate is secured to each end of said blade means, said end plate having rearward and forward ends, a second support means being pivotally secured at its lower end to each of said end plates adjacent the forward end thereof and extending upwardly and rearwardly therefrom, a support arm secured to each of said second support means and extending downwardly and forwardly therefrom beneath said blade means and said gripping roll, the lower end of each of said support arms being rigidly secured to said first shaft means.

12. The mechanism of claim 11 wherein each of said second support means comprises a spring loaded support member slidably mounted therein, the lower end of said support member being pivotally connected to the end plate associated therewith, a spring means engaging said support member to yieldably resist the upward movement of said support member with respect to said second support means, said spring means normally urging said end plate and said blade means towards said gripping roll while yieldably permitting said blade means to move away from said gripping rod to compensate for various skin thicknesses.

13. A blade control mechanism for a skinning machine having rearward and forward ends comprising:
   a frame;
   a laterally extending gripping roll;
   a blade positioned adjacent said gripping roll;
   means for rotating said gripping roll whereby a layer of meat can be moved rearwardly towards said blade to separate a layer of skin from said meat;
   blade control means for controlling the position of said blade with respect to said gripping roll, said blade control means having a blade holder holding said blade and being movably mounted on said frame for movement from a first position wherein said blade is spaced a predetermined distance from said gripping roll to a second position wherein said blade is closer to said gripping roll for removing said layer of skin from said meat;
   said blade holder being automatically movable from said first position to said second position in response to said meat being urged into contact with said blade by said gripping roll, whereby said blade is moved toward said gripping roll in response to said meat being urged into contact with said blade by said gripping roll.

14. A blade control mechanism according to claim 13 wherein said blade holder is pivotally mounted to said frame about an axis which is below said blade whereby said blade is urged toward said gripping roll in response to feeding pressure from said meat.

15. A blade control mechanism according to claim 14 wherein a first spring means yieldably urges said blade holder to said first position wherein said blade is spaced said predetermined distance from said gripping roll.

16. A blade control mechanism according to claim 15 wherein said blade is movably mounted with respect to said blade holder for movement toward and away from said gripping roll; second spring means yieldably urging said blade toward said gripping roll, said blade being yieldable away from said gripping roll against the bias of said second spring means in response to increased thicknesses of said skin passing between said blade and said gripping roll.

* * * * *